2 Sheets—Sheet 1.

T. PARKER.
Sluice-Way Gate.

No. 226,455. Patented April 13, 1880.

Witnesses:
J. P. Th. Lang.
R. Boeken.

Inventor:
Thomas Parker
by
Mason Fenwick & Lawrence
Attorneys.

T. PARKER.
Sluice-Way Gate.
No. 226,455. Patented April 13, 1880.
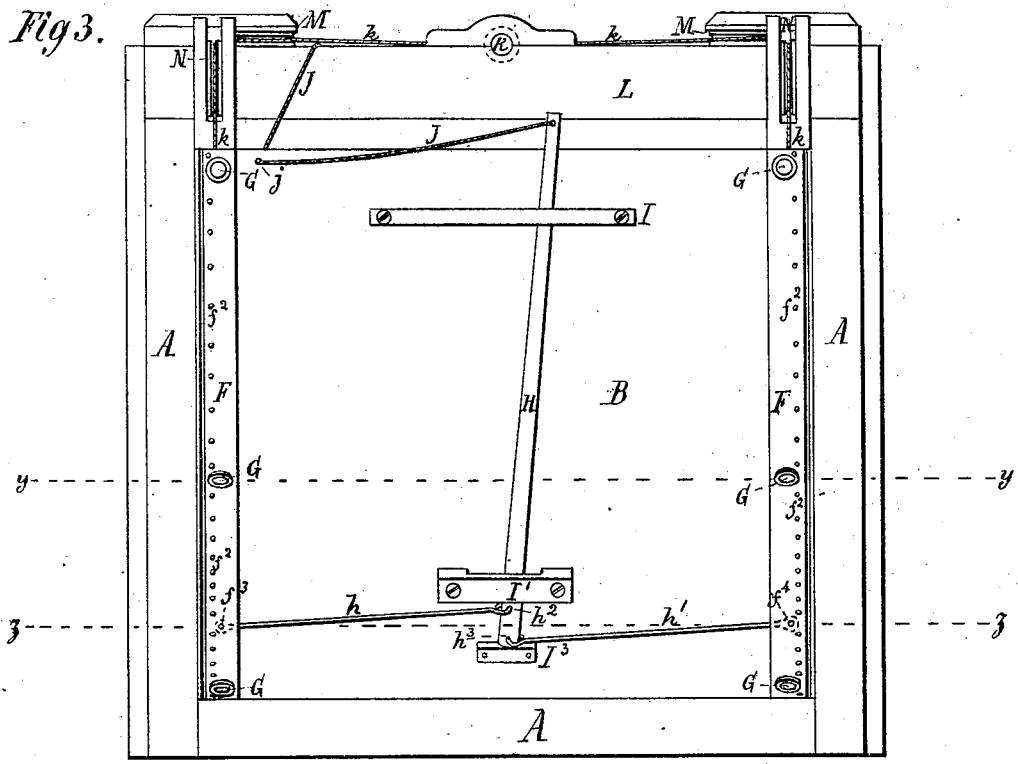
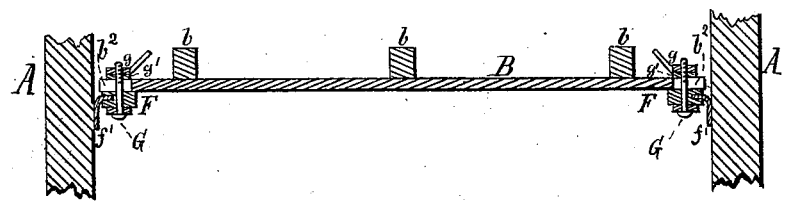
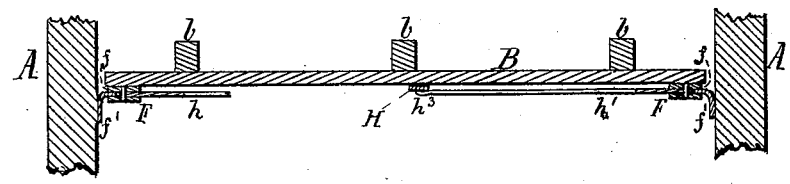
Witnesses:
J. P. Th. Lang.
A. J. Tolman
Inventor:
Thomas Parker
by
Mason Fenwick & Lawrence
Attorneys

UNITED STATES PATENT OFFICE.

THOMAS PARKER, OF MENOMONEE, WISCONSIN, ASSIGNOR TO JEREMIAH B. TAINTER, ANDREW TAINTER, AND JAMES DOWNING, ONE-FOURTH TO EACH.

SLUICEWAY-GATE.

SPECIFICATION forming part of Letters Patent No. 226,455, dated April 13, 1880.

Application filed September 1, 1879.

*To all whom it may concern:*

Be it known that I, THOMAS PARKER, of Menomonee, in the county of Dunn and State of Wisconsin, have invented a new and useful Improvement in Sluiceway-Gates, which improvement is fully described in the following specification and annexed drawings, in which—

Figure 1:
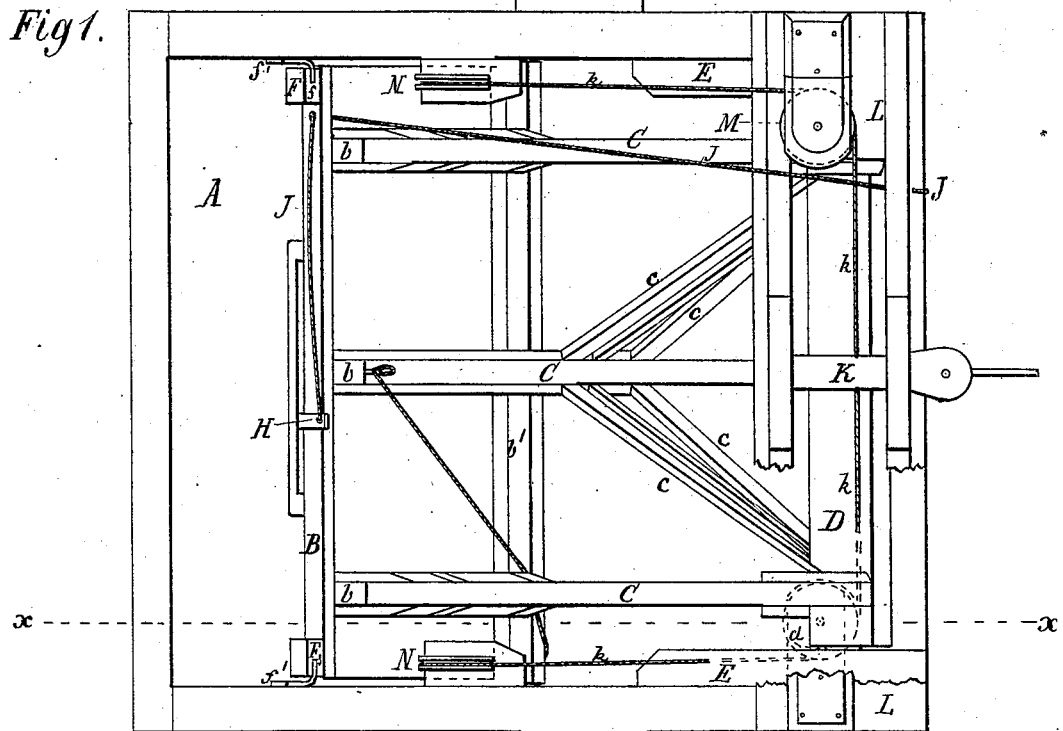
Figure 2:
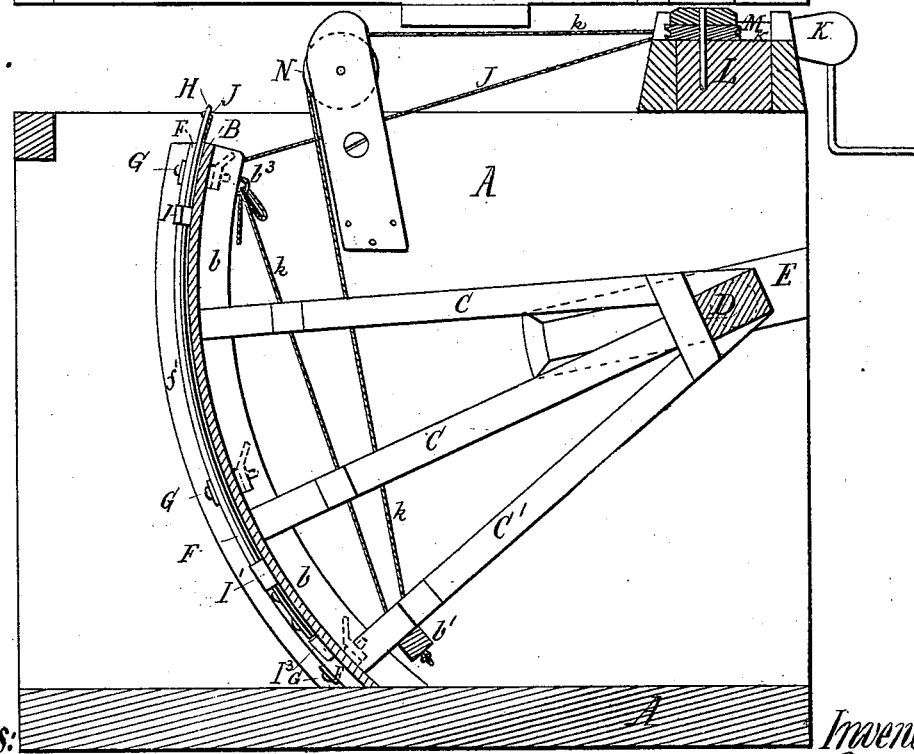

Figure 1 is a top view of my improved sluiceway gate, showing a portion of the windlass-support broken away in order to expose the parts below. Fig. 2 is a vertical longitudinal section of the sluiceway and the gate in the line $x\ x$ of Fig. 1. Fig. 3 is a front view of the gate. Fig. 4 is a horizontal section of the gate in the line $y\ y$ of Fig. 3. Fig. 5 is a horizontal section of the gate in the line $z\ z$ of Fig. 3.

The nature of my invention consists, first, in a sluiceway-gate provided with a curved or segmental surface which is eccentric to the fulcrum upon which the gate swings. By constructing the gate with its curved surface eccentric to its fulcrum it is thrown forward at the top and a more perfect balance of the gate is secured while it is being either raised or lowered, and thus the labor of opening and closing the gate is greatly reduced, and also all undue pressure upon the gate while it is closed is prevented; second, in arranging the back stays of the segmental portion of the gate at unequal distances apart, so that the gate shall be sustained at those points where the greatest pressure comes against it as effectually as at those points where the pressure is the least; third, in certain constructions and combinations hereinafter fully described and specifically claimed.

In the drawings, A represents an ordinary sluiceway, and B a sluice-gate. The gate B is curved in the segment of a circle, and is provided with similar-shaped strengthening-ribs $b$, to each of which ribs a number (say three) of radial (or nearly so) stays, C C′, are fastened. Said stays extend back to a horizontal oscillating fulcrum-bar, D, to which they are suitably and firmly united, the middle stays being laterally steadied by means of diagonal braces $c$ about midway, whereby the great strain on the central portion of the gate is partly directed toward the end of the bar D, and the lower stays, C′, are united and strengthened by a transverse bar, $b'$, the ends of which bar bear against the sides of the sluiceway, and thus keep the gate in central position, and by employing this bar $b'$ the ribs $b$ are laterally steadied also.

The topmost stays are about two inches longer than those at the bottom, and those which are midway between the top and bottom stays are about one inch shorter than the top stays or one inch longer than the lower stays. This difference in the length of the stays inclines the top of the gate to the front and changes the angle of pressure, thus giving a lifting tendency to the water just sufficient to overcome the friction of the packing at the sides of the gate and of the bearings upon which the gate is caused to swing.

Under my construction a gate about fourteen feet high and sixteen feet wide and under full pressure—say forty-eight tons—will, it is thought, draw no heavier under full pressure than it would if there were no water against it, inasmuch as the eccentric circular front of the gate does not permit the water to get any advantage for holding it down; but, on the contrary, a lifting advantage is given to the water by having the top of the gate inclined to the front, as shown in the drawings.

The bar D is provided with end journals, $d$, which are supported by bearing-blocks E, suitably fastened to the side walls of the sluiceway. These journals may be provided with a sheet-iron covering where they have to sustain the severest resistance, in order to prevent excessive wear.

In constructing my gate I form its front or curved surface concentric with a center which is above the center of the fulcrum-bar, and thus the chord of the segment of the gate is inclined backward from the top of the gate to its bottom, or, in other words, the curved surface of the gate is eccentric to the journal of the gate, and by this means the gate is relieved from the downward pressure of the water which occurs when the fulcrum is placed near the bottom of the canal, or, in other words, the greater pressure of the water upon the gate below its journal is made to exert a partial upward as well as radial pressure, and the gate is by this means nearly balanced, and the pressure of the water assists the operator in raising the gate.

The stays C C' are so arranged in transverse rows that the lower row is near the bottom edge of the gate, the top row some distance below the top of the gate, and the intermediate row much nearer to the bottom row than the top row. Thus the stays are placed at unequal distances apart, being nearer together where the pressure of the water is the greatest, or where the gate is required to be stayed very firmly, or, in other words, the stays are spaced unequally in transverse rows, in accordance with the increasing pressure of water below its fulcrum.

The gate is fitted very loosely into the sluiceway, so that it will not become jammed if the walls of the sluiceway should work or become slightly displaced, and leakage is prevented by means of adjustable side packings. These side packings consist, respectively, of a strip, F, with a curvature corresponding to that of the gate, and grooved at the edge, as at $f$, and provided with a piece of india-rubber belting, $f'$, partly inserted in said groove, and fastened therein by nails $f^2$ or other means, and bent at right angles to the attached edges, so as to bear with a broad face against the inner side of the sluiceway, as shown. One of these strips F is adjustably attached to each side edge of the face-gate, so that its flapping or free portion is forced against the side of the sluiceway.

The strips F are made adjustable by means of transverse end slots, $b^2$, in the gate B, in which slots bolts G, attached rigidly to the strips F, and by which the strips are connected to the gate, are moved to and from the sides of the sluiceway when the strips are adjusted. The said bolts G are provided with nuts $g$ and washers $g'$, which latter slide over the slots $b^2$ and upon the rear side of the gate when the strips F are moved.

The adjustment or motion of the strips F is effected by means of an upright lever, H, and two connecing-rods, $h$ $h'$, which latter are pivoted to the strips at $f^3 f^4$ and connected to the lever H at $h^2$ $h^3$.

The lever H is curved correspondingly with the gate, and is held upon its face by lateral guides I I', and is prevented from slipping downward by a foot-block, I³, fastened to the gate.

To the upper end of the lever H a hand-cord, J, is fastened, which is passed through the gate at $j$, and thence through the windlass-support L, and to a suitable cleat, to which it is fastened.

By pulling the hand-cord J the lever H is caused to swing sidewise and push the connecting-rods $h$ $h'$ and the packing-strips F toward the sides of the sluiceway. By letting the cord loose the packing will be pushed back by means of its own elasticity, and thus its frictional resistance to the movement of the gate decreased.

The inclination of the gate, in connection with its curved surface, insures the working of the gate on nearly a balance while being raised or lowered, the gate being only heavy enough to remain steady when closed.

The gate is raised by means of a windlass, K, hung to the support L at the rear of the gate, and the rope $k$ of said windlass is passed through the drum of the windlass and over two horizontal guide-pulleys, M, over two vertical guide-pulleys, N, and down to the bar $b'$, to which one of its ends is fastened, while the free end of the rope is passed down and around the bar $b'$ at its opposite end, and from thence up to a hook or loop, $b^3$, on the upper portion of the gate, where it is tied. In practice this windlass will be provided with a ratchet-wheel and pawl, in order to keep the gate suspended at any desirable height.

By the described arrangement of the rope $k$ the operator can regulate its length equally on each side of the windlass-drum while the gate is closed by drawing the rope through the drum more or less, and thus when the gate is raised it will not tilt and cause undue end strain upon the packing.

What I claim is—

1. A sluiceway-gate provided with a segmental or curved surface which is eccentric to the fulcrum upon which the gate is made to swing, substantially as and for the purpose herein described.

2. The back stays C C C' of the segmental gate B, placed at unequal distances apart, and arranged nearer together at the lower portion of the gate, substantially as and for the purpose described.

3. The combination of the gate B, adjustable packing-strips F, connecting-rods $h$ $h'$, and operating-lever H, substantially as and for the purpose described.

4. The combination of the sluiceway A, gate B, and centering-bar $b'$, substantially as and for the purpose set forth.

5. The combination of the gate B, windlass K, rope $k$, and guide-pulleys M N, substantially as and for the purpose described.

THOMAS PARKER.

Witnesses:
W. H. ALLEN,
N. B. NOBLE.